US012674338B2

(12) United States Patent
Sterba

(10) Patent No.: US 12,674,338 B2
(45) Date of Patent: Jul. 7, 2026

(54) GARAGE DOOR HANDLE SYSTEMS AND APPARATUSES

(71) Applicant: George Jiri Sterba, Cambridge (CA)

(72) Inventor: George Jiri Sterba, Cambridge (CA)

( * ) Notice: Subject to any disclaimer, the term of this patent is extended or adjusted under 35 U.S.C. 154(b) by 0 days.

(21) Appl. No.: 18/669,965

(22) Filed: May 21, 2024

(65) Prior Publication Data

US 2024/0392602 A1 Nov. 28, 2024

Related U.S. Application Data

(60) Provisional application No. 63/577,771, filed on May 22, 2023.

(51) Int. Cl.

| | |
|---|---|
| ***A45C 13/22*** | (2006.01) |
| ***E05B 1/00*** | (2006.01) |
| ***E05B 7/00*** | (2006.01) |
| ***E05D 3/02*** | (2006.01) |
| ***E05D 11/00*** | (2006.01) |
| ***E05D 15/24*** | (2006.01) |

(52) U.S. Cl.

CPC .............. *E05B 1/0015* (2013.01); *E05B 7/00* (2013.01); *E05D 3/02* (2013.01); *E05D 15/242* (2013.01); *E05Y 2900/106* (2013.01); *E05Y 2900/132* (2013.01)

(58) Field of Classification Search

CPC ...... E05B 1/0015; E05B 1/003; E05B 1/0053; E05B 7/00; E05B 2001/0023; E05D 3/02; E05D 15/242; E05D 15/244; E05D 15/26; E05Y 2900/106; E05Y 2900/132

See application file for complete search history.

(56) References Cited

U.S. PATENT DOCUMENTS 1,232,415 A * 7/1917 Whitney ............. E05D 11/0081
16/223
1,944,670 A * 1/1934 Redrup ................... E06B 3/483
160/207

(Continued)

FOREIGN PATENT DOCUMENTS

CN 104806094 A * 7/2015
CN 204531815 U * 8/2015

(Continued)

*Primary Examiner* — Chuck Y Mah

(74) *Attorney, Agent, or Firm* — Own Innovation Inc.; James W. Hinton; Osman Ismaili

(57) ABSTRACT

A system for operating a garage door is provided. The system includes a hinge assembly of the garage door, and an apparatus including a body, having a handle member end and an attachment end, the attachment end pivotably attachable to the hinge assembly. An apparatus for operating a garage door is provided. The apparatus includes a body, having a handle member end and an attachment end connected to the handle member end, the attachment end pivotably attachable to a hinge assembly of the garage door. A garage door handle system is provided. The system includes a handle member configured to engage with a handle arm, the handle arm configured to engage with a clevis pin, the clevis pin configured to pivotably couple the handle arm with a garage door hinge, and a hitch pin configured to prevent disengagement of the clevis pin from the garage door hinge.

20 Claims, 6 Drawing Sheets

(56) References Cited

U.S. PATENT DOCUMENTS

| | | | | | |
|---|---|---|---|---|---|
| 2,319,147 | A * | 5/1943 | Mason | A47J 45/062 220/759 |
| 4,794,667 | A * | 1/1989 | Nelson | B25G 1/00 294/58 |
| 4,799,291 | A * | 1/1989 | Ankum | E05D 7/1061 16/259 |
| 5,722,118 | A * | 3/1998 | Hansen | A45F 5/102 16/113.1 |
| 6,050,427 | A * | 4/2000 | Loveland | E05D 11/00 211/119.004 |
| 7,717,292 | B2 * | 5/2010 | Faust, III | A61B 50/30 16/421 |
| 11,013,325 | B2 * | 5/2021 | Meyer | A47F 5/0006 |
| 11,971,236 | B1 * | 4/2024 | James | F41A 23/00 |
| 12,012,804 | B2 * | 6/2024 | Cleavenger | E06B 9/58 |
| 2008/0315561 | A1 * | 12/2008 | Anderson | B60D 1/54 280/491.1 |
| 2019/0387883 | A1 * | 12/2019 | Meyer | A47B 81/005 |
| 2024/0151086 | A1 * | 5/2024 | Mason | E06B 3/485 |

FOREIGN PATENT DOCUMENTS

| | | | | |
|---|---|---|---|---|
| JP | 07269213 | A * | 10/1995 | |
| KR | 481232 | Y1 * | 9/2016 | E05D 15/26 |

* cited by examiner

FIG. 2
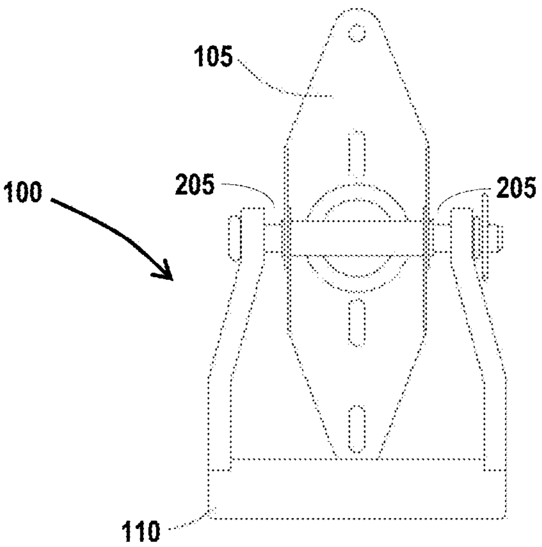
FIG. 3
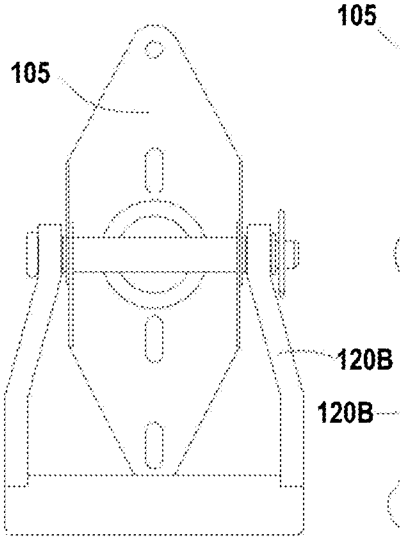
FIG. 4
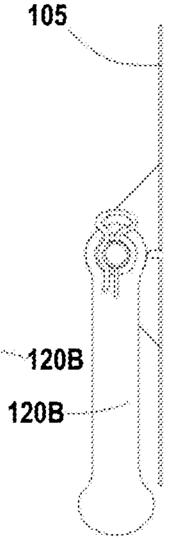
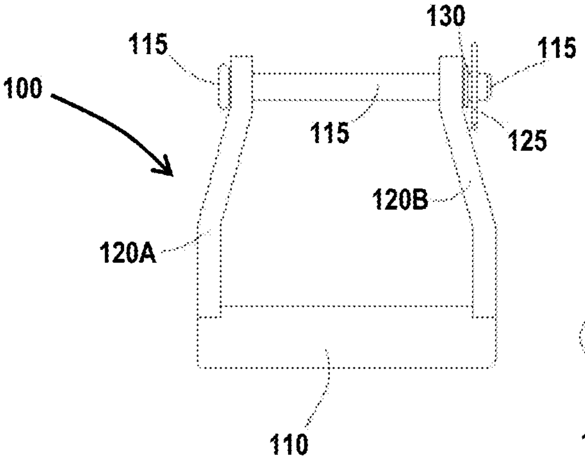
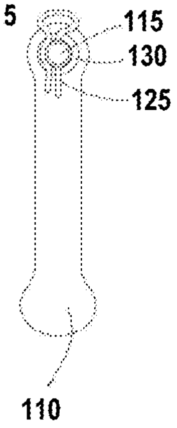
FIG. 5
FIG. 6

FIG. 7
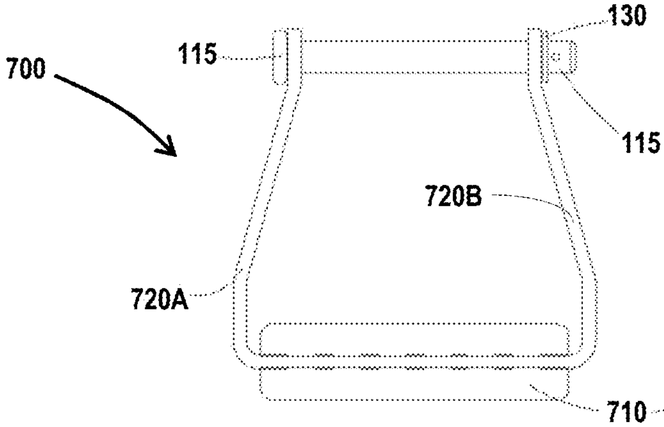
FIG. 8
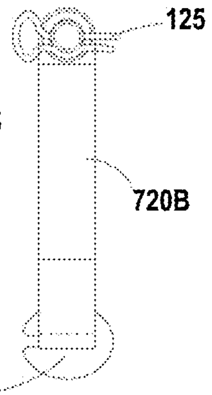
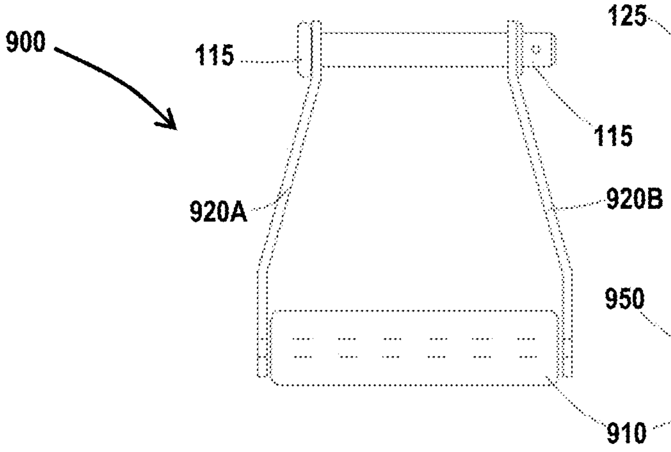
FIG. 9
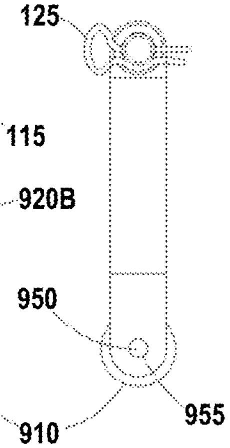
FIG. 10

FIG. 13
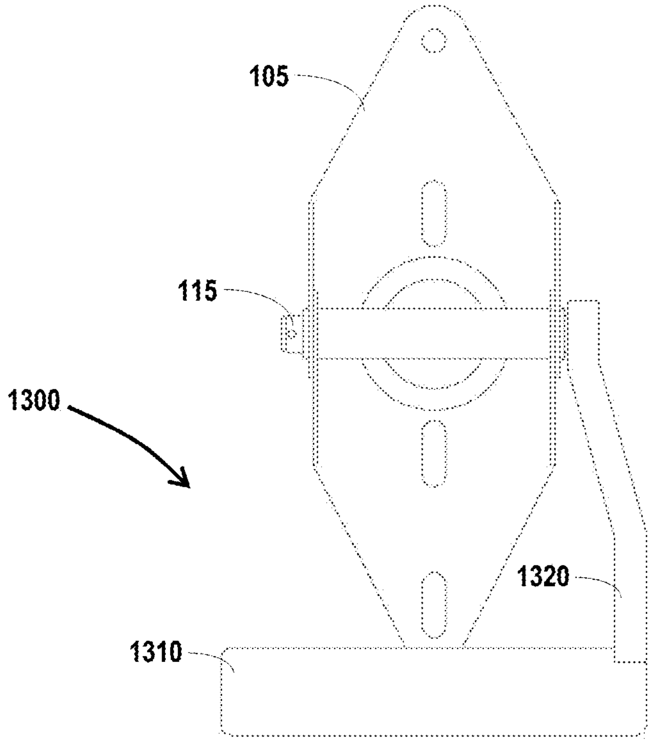
FIG. 14
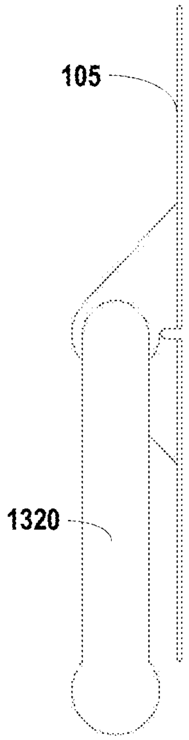
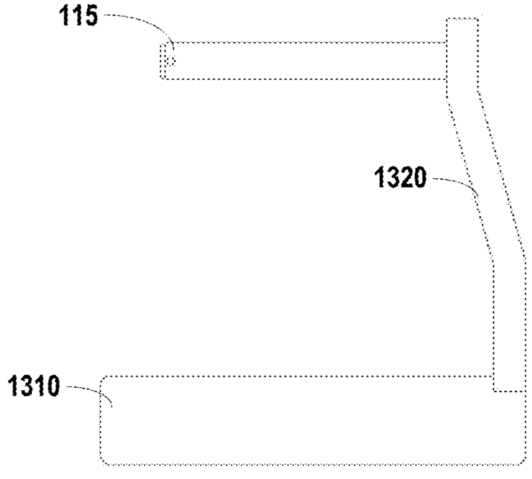
FIG. 15
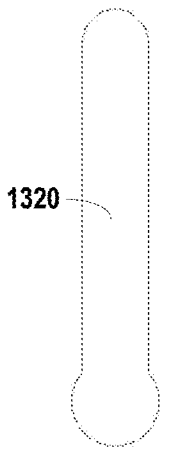
FIG. 16

GARAGE DOOR HANDLE SYSTEMS AND APPARATUSES

TECHNICAL FIELD

The following relates generally to a garage door handle construction, and more particularly to systems and apparatuses for an improved garage door handle for opening and closing garage doors more easily.

INTRODUCTION

Historically, residential garage doors would typically be opened and closed manually using a handle permanently affixed to one or both sides of the door. Such a handle would require a hole to be drilled through the garage door to ensure that it could be affixed to the door in a manner that was both safe and secure.

The advent of motorized garage door openers however gradually eliminated the need for opening and closing garage doors by hand. This is turn meant that permanent garage door handles which required drilling would also no longer be needed.

Similarly, there has been a rising trend in the desire to have a uniform, aesthetically pleasing garage door exterior, that is unmarred and unblemished by a handle. Whether the handle is installed on the interior or the exterior, it still requires a hole to be drilled through the garage door, and possibly reinforcements around the attachment area, which are visible on both the interior and exterior of the door.

Moreover, by drilling holes through the steel panels of a garage door, the bare metal of the garage door is exposed to the elements. This can lead to rusting of the garage doors, which can not only weaken the structure but can also result in rust stains on the garage doors. This is yet another reason why it may not be desirable to drill holes in the garage door panels.

However, there may be times where a motorized garage door opener fails to work (e.g., during a power outage) and a handle is required to manually open a garage door. Similarly, there may be those who do not wish to have a motorized garage door opener but would still desire to have an unmarred garage door exterior.

Accordingly, there is a need for an improved garage door handle that overcomes at least some of the disadvantages of existing techniques and technologies.

This background information is provided to reveal information believed by the applicant to be of possible relevance to the present disclosure. No admission is necessarily intended, nor should be construed, that any of the preceding information constitutes prior art against the present disclosure.

SUMMARY

A system for operating a garage door is provided. The system includes a hinge assembly of a first and second panel of the garage door. The system further includes an apparatus including a body, having a handle member end and an attachment end. The attachment end is pivotably attachable to the hinge assembly.

In an embodiment, the attachment end is pivotably attachable to the hinge assembly using a clevis pin.

In an embodiment, the clevis pin is configured to receive a hitch pin to prevent detachment of the clevis pin.

In an embodiment, the apparatus is made of at least one of durable plastic, and metal.

In an embodiment, a handle member at the handle member end is made of at least one of wood, steel, plastic, and rubber.

In an embodiment, the body is made of a single piece of material.

In an embodiment, the body further includes a rod within the handle member, the rod linking a first side of the attachment end to a second side of the attachment end.

In an embodiment, the handle member end and the attachment end comprise a single piece of material having at least one point of attachment to the hinge assembly.

An apparatus for operating a garage door is provided. The apparatus includes a body, having a handle member end and an attachment end connected to the handle member end. The attachment end is pivotably attachable to a hinge assembly connecting a first and second panel of the garage door.

In an embodiment, the attachment end includes a clevis pin configured to pivotably couple the body with a hinge assembly.

In an embodiment, the body is made of at least one of durable plastic, and metal.

In an embodiment, a handle member at the handle member end is made of at least one of wood, steel, plastic, and rubber.

In an embodiment, the body is made of a single piece of material.

In an embodiment, the body further includes a rod within the handle member, the rod linking a first side of the attachment end to a second side of the attachment end.

A garage door handle system is provided. The system includes a handle member configured to engage with a handle arm. The system further includes the handle arm configured to engage with a clevis pin. The system further includes the clevis pin configured to pivotably couple the handle arm with a garage door hinge assembly. The system further includes a hitch pin configured to prevent disengagement of the clevis pin from the garage door hinge assembly.

In an embodiment, the handle arm is made of at least one of durable plastic, and metal.

In an embodiment, the handle member is made of at least one of wood, steel, plastic, and rubber.

In an embodiment, further comprising another handle arm.

In an embodiment, the system further includes a rod within the handle member, the rod coupling the handle arm to another handle arm.

In an embodiment, the handle member and the handle arm comprise a single piece of material having at least one point of attachment to the garage door hinge assembly.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 2 is a front view of the handle of FIG. 1, according to an embodiment;

FIG. 3 is another front view of the handle of FIG. 1, according to an embodiment;

FIG. 4 is a side view of the handle of FIG. 1, according to an embodiment;

FIG. 5 is another front view of the handle of FIG. 1, according to an embodiment;

FIG. 6 is another side view of the handle of FIG. 1, according to an embodiment;

FIG. 7 is a front view of another example garage door handle, according to an embodiment;

FIG. 8 is a side view of the handle of FIG. 7, according to an embodiment;

FIG. 9 is a front view of another example garage door handle, according to an embodiment;

FIG. 10 is a side view of the handle of FIG. 7, according to an embodiment;

FIG. 13 is a front view of another example garage door handle, according to an embodiment;

FIG. 14 is a side view of the handle of FIG. 13, according to an embodiment;

FIG. 15 is another front view of the handle of FIG. 13, according to an embodiment; and FIG. 16 is another side view of the handle of FIG. 13, according to an embodiment.

DETAILED DESCRIPTION

Figure 1:
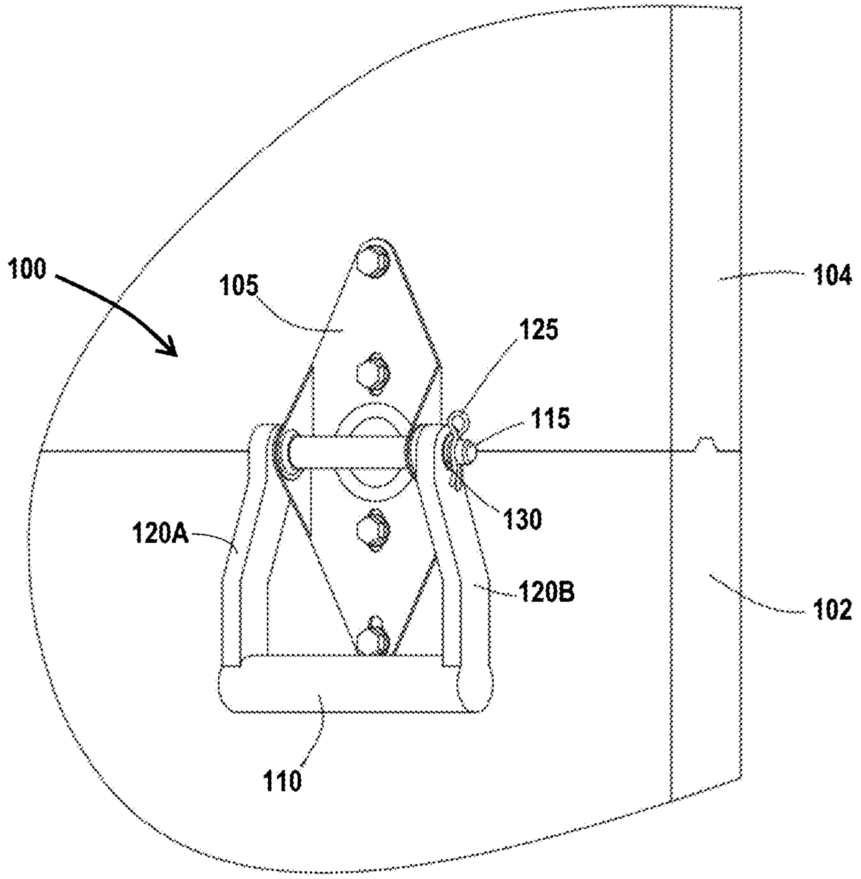
FIG. 1 is a perspective view of an example garage door handle, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

As used herein, the term "about" should be read as including variation from the nominal value, for example, a +/−10% variation from the nominal value. It is to be understood that such a variation is always included in a given value provided herein, whether or not it is specifically referred to.

A description of an embodiment with several components in communication with each other does not imply that all such components are required. On the contrary, a variety of optional components are described to illustrate the wide variety of possible embodiments of the present disclosure.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The present disclosure relates generally to a garage door handle and, in particular, to systems and apparatuses for an improved garage door handle for opening and closing garage doors more easily.

The garage doors to which the present disclosure relates are of the overhead sectional garage doors. This handle will be attached to the central hinge assembly (also referred to herein as the hinge) which connects the first and second panels of the garage door.

The installation of this handle is simple and will not require usage of any tools. It can be installed easily by any individual without any mechanical skills.

Due to the perceived aspect of the handle installation, the garage doors will not get damaged by drilling holes to securely attach the handle. At this time, most sectional garage doors are manufactured of very thin material to reduce weight and cost, therefore it may not be practical to attach a typical handle to this type of garage door.

As this handle is positioned at the joint of the first and second panel, it will be easier for the user to open and close the garage door with less struggle and strain to the back.

Advantageously, the garage door handle disclosed herein may be installed rapidly by laypeople as it requires neither tools, nor any specific expertise. For example, in some cases it may take less than 30 seconds to install the garage door handle disclosed herein.

Similarly, the robust design of the garage door handle and straightforward attachment thereof to a garage door hinge assembly allows for a safe and secure garage door handle which may be easily attached or removed, as necessary.

Referring now to FIG. 1, shown therein is an example handle 100 attached to a hinge 105 assembly of the center panels 102 and 104 of a garage door, according to an embodiment.

In various embodiments, the handle member 110 is connected to the hinge 105 by the clevis pin 115.

In some embodiments, the clevis pin 115 bridges the left arm 120A of the handle 100 through the cylindrical aperture of the hinge 105 to the right arm 120B of the handle 100.

In various embodiments, the handle member 110 together with the left arm 120A and right arm 120B comprise a body of the handle 100.

The handle member 110 comprises a handle member end of the body, and the left arm 120A and right arm 120B comprise an attachment end of the body.

In various embodiments, the attachment end of the body is pivotably attachable to a hinge 105 assembly of a garage door.

In some embodiments, the clevis pin 115 is secured in place by a hitch pin 125.

In various embodiments, a flat washer 130 may also be placed over clevis pin 115 prior to attaching hitch pin 125.

In various embodiments, the handle 100 is made of a durable plastic such as acrylonitrile butadiene styrene (ABS), polycarbonate, or the like.

Referring now to FIG. 2, shown therein is a front view of the handle 100 of FIG. 1 attached to the hinge 105 assembly, according to an embodiment.

Advantageously, despite the possibility of a hinge 105 being of varying width dimensions, the handle 100 is able to accommodate the wider most common hinge 105. A similar benefit realized is that due to the design of the handle 100, any gap 205 between the arms 120A and 120B and the hinge 105 does not affect the function of the handle 100.

Referring now to FIG. 3, shown therein is another front view of the garage door handle 100 of FIG. 1 attached to the hinge 105 assembly, according to an embodiment.

In FIG. 3, a wider hinge 105 is depicted, resulting in no gap between the arms 120A and 120B and the hinge 105.

Referring now to FIG. 4, shown therein is a side view of the garage door handle 100 of FIG. 1 attached to the hinge 105 assembly, according to an embodiment.

Referring now to FIG. 5, shown therein is a front view of the handle 100 of FIG. 1 prior to being attached to the hinge 105, according to an embodiment.

In some embodiments, the handle arms 120A and 120B have round apertures for the clevis pin 115 to be inserted through the handle arms 120A and 120B and bridge the left arm 120A and right arm 120B of the handle 100.

Advantageously, the span between the left arm 120A and right arm 120B of the handle 100 will conform to the width of the hinge 105, allowing the handle 100 to be adjustable to various hinge 105 widths.

In various embodiments, the span between the left arm 120A and right arm 120B at the grasping part (handle member) 110 of the handle 100 will accommodate the width of a hand.

In various embodiments, the hitch pin 125 provides a secure means to keep the clevis pin 115 in place.

Referring now to FIG. 6, shown therein is a side view of the garage door handle 100 of FIG. 1 prior to being attached to the hinge 105, according to an embodiment.

Referring now to FIG. 7, shown therein is an example garage door handle 700 constructed of metallic material such as steel, aluminum or another suitable metal, according to an embodiment.

In various embodiments, the procedure to attach the metal handle to a hinge 105 (not shown) is same as with the plastic handle 100.

In some embodiments, the grasping part (handle member) 710 of the handle 700 is made out of wood, steel, plastic, rubber or another suitable material.

Advantageously, the span between the left arm 720A and right arm 720B of the handle 700 conforms to the width of the hinge 105 (not shown), allowing the handle 100 to be adjustable to various hinge 105 widths.

In various embodiments, the span between the left arm 720A and right arm 720B at the gripping part (handle member) 710 of the handle 700 will accommodate the width of a hand.

In various embodiments, the left arm 720A and right arm 720B of the handle 700 may be one single member that has been bent or shaped accordingly.

In various embodiments, the handle member 710 together with the left arm 720A and right arm 720B comprise a body of the handle 700.

The handle member 710 comprises a handle member end of the body, and the left arm 720A and right arm 720B comprise an attachment end of the body.

In various embodiments, the attachment end of the body is pivotably attachable to a hinge 105 assembly of a garage door.

Referring now to FIG. 8, shown therein is a side view of the garage door handle 700 of FIG. 7, according to an embodiment.

Referring now to FIG. 9, shown therein is a front view of the garage door handle 900 constructed of metallic material such as steel, aluminum or another suitable metal, according to an embodiment.

In some embodiments, the handle 900 consists of the left arm 920A and right arm 920B.

In various embodiments, the left arm 920A is linked to the right arm 920B by metal rod 950 (not shown).

In various embodiments, a rod 950 is fastened to the left arm 920A and right arm 920B by plug welding 955 (not shown).

In some embodiments, the grasping part (handle member) 910 of the handle 900 is made out of wood, steel, plastic, rubber or another suitable material.

Advantageously, the span between the left arm 920A and right arm 920B of the handle 900 conforms to the width of the hinge 105 (not shown), allowing the handle 100 to be adjustable to various hinge 105 widths.

In various embodiments, the span between the left arm 920A and right arm 920B at the grasping part (handle member) 910 of the handle 900 will accommodate the width of a hand.

Referring now to FIG. 10, shown therein is a side view of the garage door handle 900 of FIG. 9, according to an embodiment.

FIG. 10 depicts the rod 950 and the plug welding 955 described in FIG. 9.

Figure 11:
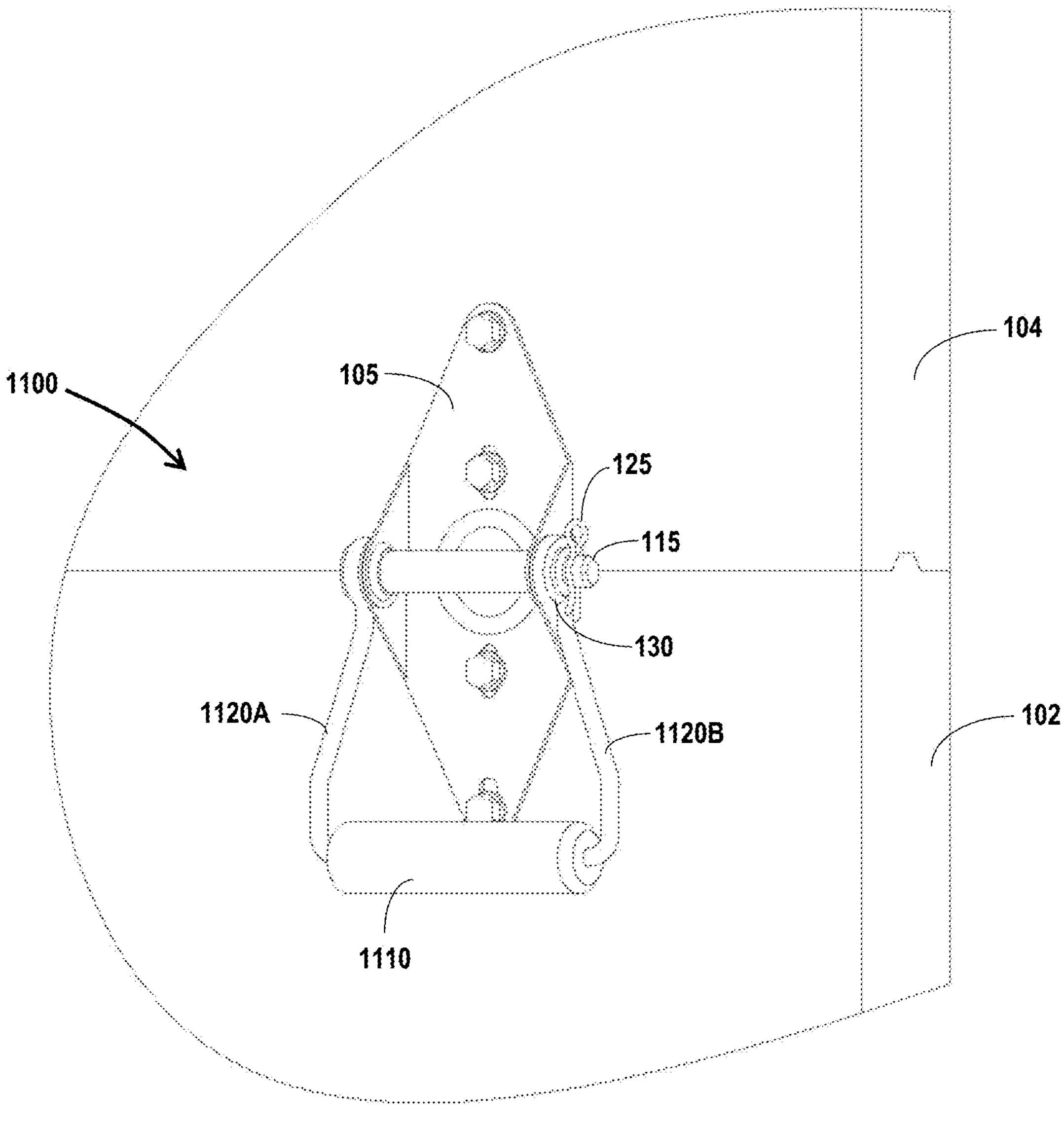
FIG. 11 is a perspective view of another example garage door handle, according to an embodiment.

Referring now to FIG. 11, shown therein is an example handle 1100 constructed of metallic material such as steel, aluminum or another suitable metal, according to an embodiment.

The handle 1100 is depicted as attached to a hinge 105 assembly of the center panels 102 and 104 of a garage door.

In various embodiments, the handle member 1110 is connected to the hinge 105 by the clevis pin 115.

In some embodiments, the clevis pin 115 bridges the left arm 1120A of the handle 1100 through the cylindrical aperture of the hinge 105 to the right arm 1120B of the handle 1100.

In various embodiments, the handle member 1110 together with the left arm 1120A and right arm 1120B comprise a body of the handle 1100.

The handle member 1110 comprises a handle member end of the body, and the left arm 1120A and right arm 1120B comprise an attachment end of the body.

In various embodiments, the attachment end of the body is pivotably attachable to a hinge 105 assembly of a garage door.

In various embodiments, the clevis pin 115 is secured in place by a hitch pin 125.

In some embodiments, the flat washer 130 may also be placed over clevis pin 115 prior to attaching hitch pin 125.

In some embodiments, the grasping part (handle member) 1110 of the handle 1100 is made out of wood, steel, plastic, rubber or another suitable material.

Figure 12:
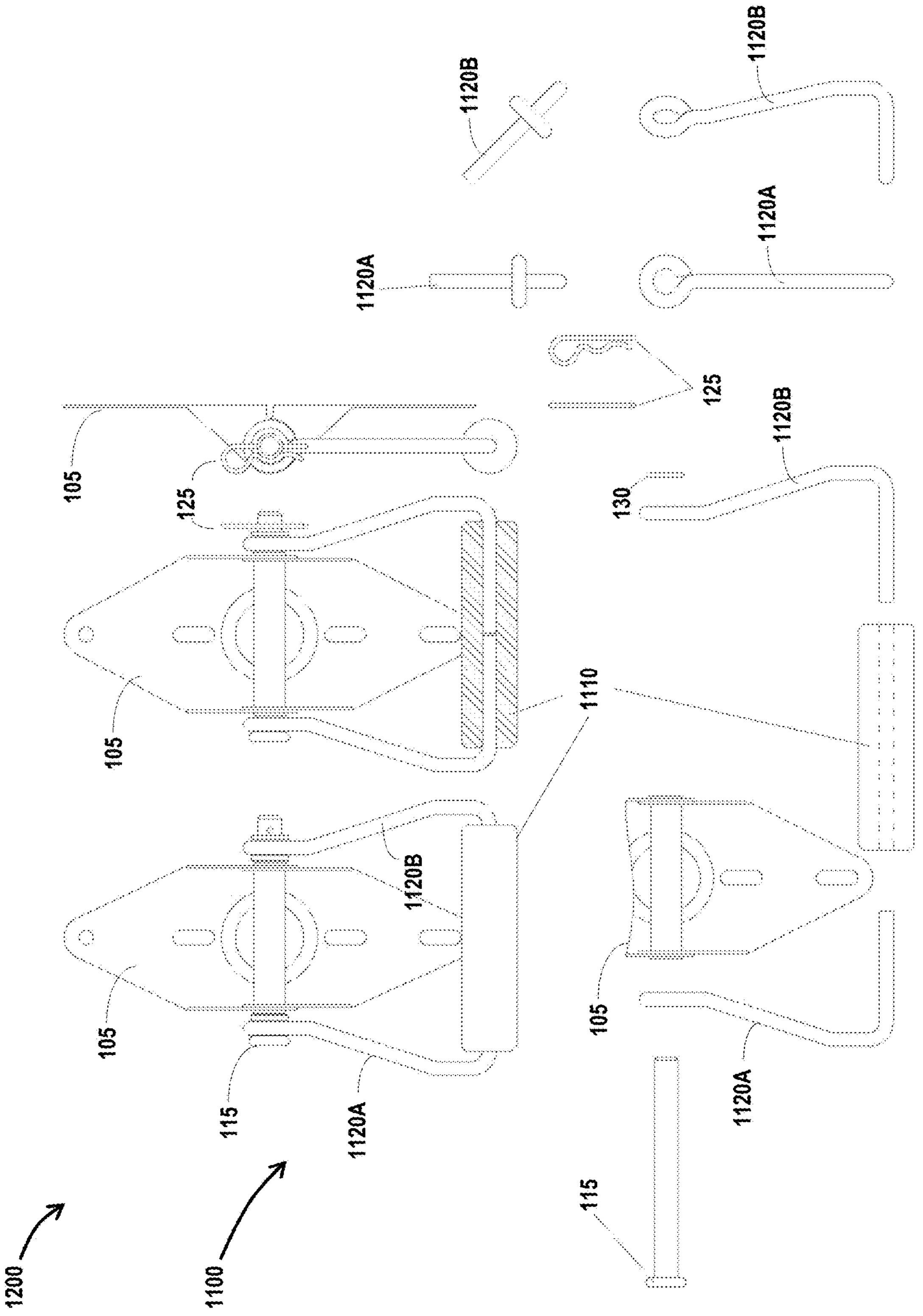
FIG. 12 is an example garage door handle system including the handle of FIG. 11, according to an embodiment.

Referring now to FIG. 12, shown therein is an example garage door handle system 1200 including the handle 1100 of FIG. 11, according to an embodiment.

The system 1200 includes a handle member 1100 configured to engage with at least one handle arm 1120A or 1120B.

The system 1200 further includes the at least one handle arm 1120A or 1120B configured to engage with a clevis pin 115.

In some embodiments, both handle arms 1120A and 1120B may be used.

An embodiment of handle arms 1120A and 1120B is depicted from various perspectives, however these depictions are not to be taken as a limiting factor as the shape of handle arms 1120A and 1120B may vary.

In some embodiments, and as depicted, handle arms 1120A and 1120B may be two separate pieces that are not permanently joined to each other.

In other embodiments, handle arms 1120A and 1120B may be a single piece of material that is joined together, for example, within the handle member 1110.

The system 1200 further includes the clevis pin 115 configured to pivotably couple the at least one handle arm 1120A or 1120B with a garage door hinge 105 assembly.

The system 1200 further includes a hitch pin 125 configured to prevent disengagement of the clevis pin from the garage door hinge assembly.

The hitch pin 125 is depicted from various perspectives to illustrate a suitable shape, however these depictions are not to be taken as a limiting factor.

In some embodiments, handle arms 1120A and 1120B are made of at least one of durable plastic, and metal.

In some embodiments, flat washer 130 may be inserted over the insertion end of clevis pin 115 prior to attaching 125.

Including a flat washer 130 may aid in pivotability.

Referring now to FIG. 13, shown therein is an example garage door handle 1300 having only one handle arm 1320, according to an embodiment.

The single handle arm 1320 is depicted as connecting the handle member 1310 to the hinge 105 clevis pin 115.

In some embodiments, the handle 1300 may be constructed of a metallic material such as steel, aluminum or another suitable metal.

In other embodiments, the handle 1300 may be constructed of a durable plastic such as acrylonitrile butadiene styrene (ABS), polycarbonate, or the like.

In various embodiments, the procedure to attach the metal handle to a hinge 105 is same as with the handle 100 of FIG. 1.

In some embodiments, the grasping part (handle member) 1310 of the handle 1300 is made out of wood, steel, plastic, rubber or another suitable material.

Advantageously, by having a single arm 1320, the handle 1300 will conform to the width of the hinge 105 (not shown), allowing the handle 100 to be adjustable to various hinge 105 widths.

In various embodiments, the handle member 1310 together with the arm 1320 comprise a body of the handle 1300.

The handle member 1310 comprises a handle member end of the body, and the arm 1320 comprises an attachment end of the body.

In various embodiments, the attachment end of the body is pivotably attachable to a hinge 105 assembly of a garage door.

Referring now to FIG. 14, shown therein is a side view of the garage door handle 1300 of FIG. 13 attached to the hinge 105, according to an embodiment.

Referring now to FIG. 15, shown therein is another front view of the garage door handle 1300 of FIG. 13, according to an embodiment.

In FIG. 15, the fully assembled handle 1300 is depicted as not being attached to the hinge 105.

Referring now to FIG. 16, shown therein is another side view of the garage door handle 1300 of FIG. 13, according to an embodiment.

In FIG. 16, the fully assembled handle 1300 is depicted as not being attached to the hinge 105.

While the above description provides examples of one or more apparatus, methods, or systems, it will be appreciated that other apparatus, methods, or systems may be within the scope of the claims as interpreted by one of skill in the art.

Elements of each embodiment may be incorporated into other embodiments, for example, configurations discussed in relation to one embodiment, may be applied to other embodiments disclosed herein.

Further, it is evident that various modifications and combinations may be made without departing from the invention. The specification and drawings are, accordingly, to be regarded simply as an illustration of the invention as defined by the claims, and are contemplated to cover any and all modifications, variations, combinations or equivalents that fall within the scope of the present disclosure.

The invention claimed is:

1. A system for operating a garage door comprising:
- a central #1 hinge assembly operably connected between a first section and a second section of the garage door, comprising:
  - a first hinge leaf configured to be secured to the first section, the first hinge leaf including a first tube-receiving channel formed at the first hinge leaf;
  - a second hinge leaf configured to be secured to the second section, the second hinge leaf including a second tube-receiving channel formed at the second hinge leaf; and
  - a cylindrical tube horizontally extending through the aligned first tube-receiving channel and the second tube-receiving channel, defining a pivot axis about which the first hinge leaf and the second hinge leaf rotate relative to one another, wherein the cylindrical tube includes a hollow internal channel;
- a retrofit apparatus including:
  - a body, the body including:
    - a handle member end comprising a handle member;
    - an attachment end connected to the handle member end, the attachment end comprising a left arm and a right arm, wherein the attachment end is pivotably attachable to the central #1 hinge assembly;
  - a clevis pin configured to:
    - connect the left arm and the right arm to the central #1 hinge assembly by being inserted through an aperture of the left arm, the hollow internal channel, and an aperture of the right arm, such that the body is removably attached to the central #1 hinge assembly.

2. The system of claim 1, wherein the attachment end is pivotably attached to the central #1 hinge assembly via the clevis pin.

3. The system of claim 2, wherein the clevis pin is configured to receive a hitch pin to prevent detachment of the clevis pin.

4. The system of claim 1, wherein removable attachment of the body to the central #1 hinge assembly is toolless.

5. The system of claim 1, wherein the garage door is a sectional garage door.

6. The system of claim 1, wherein the body is made of a single piece of material.

7. The system of claim 1, wherein the body further comprises a rod within the handle member, the rod linking the left arm of the attachment end to the right arm of the attachment end.

8. The system of claim 1, wherein the handle member end and the attachment end comprise a single piece of material having at least one point of attachment to the central #1 hinge assembly.

9. A retrofit apparatus for operating a garage door comprising:
- a body, the body including:
  - a handle member end comprising a handle member;
  - an attachment end connected to the handle member end, the attachment end comprising a left arm and a right arm, wherein the attachment end is pivotably attachable to a central #1 hinge assembly connecting a first and second panel operably connected between a first section and a second section of the garage door, wherein the central #1 hinge assembly comprises:

a first hinge leaf configured to be secured to the first section, the first hinge leaf including a first tube-receiving channel formed at the first hinge leaf;

a second hinge leaf configured to be secured to the second section, the second hinge leaf including a second tube-receiving channel formed at the second hinge leaf; and a cylindrical tube horizontally extending through the aligned first tube-receiving channel and the second tube-receiving channel, defining a pivot axis about which the first hinge leaf and the second hinge leaf rotate relative to one another, wherein the cylindrical tube includes a hollow internal channel;

a clevis pin configured to:

connect the left arm and the right arm to the central #1 hinge assembly by being inserted through an aperture of the left arm, the hollow internal channel, and an aperture of the right arm, such that the body is removably attached to the central #1 hinge assembly.

10. The apparatus of claim 9, wherein the attachment end is pivotably attached to the central #1 hinge assembly via the clevis pin.

11. The apparatus of claim 9, wherein removable attachment of the body to the central #1 hinge assembly is toolless.

12. The apparatus of claim 9, wherein the garage door is a sectional garage door.

13. The apparatus of claim 9, wherein the body is made of a single piece of material.

14. The apparatus of claim 9, wherein the body further comprises a rod within the handle member, the rod linking the left arm of the attachment end to the right arm of the attachment end.

15. A method for attaching a retrofit apparatus to a garage door, the method comprising:

providing a central #1 hinge assembly operably connected between a first section and a second section of the garage door, comprising:

a first hinge leaf configured to be secured to the first section, the first hinge leaf including a first tube-receiving channel formed at the first hinge leaf;

a second hinge leaf configured to be secured to the second section, the second hinge leaf including a second tube-receiving channel formed at the second hinge leaf; and a cylindrical tube horizontally extending through the aligned first tube-receiving channel and the second tube-receiving channel, defining a pivot axis about which the first hinge leaf and the second hinge leaf rotate relative to one another, wherein the cylindrical tube includes a hollow internal channel;

providing the retrofit apparatus, comprising:

a body, the body including:

a handle member end comprising a handle member;

an attachment end connected to the handle member end, the attachment end comprising a left arm and a right arm, wherein the attachment end is pivotably attachable to a garage deer the central #1 hinge assembly;

a clevis pin;

connecting the handle arm to the central #1 hinge assembly by inserting the clevis pin through an aperture of the left arm, the hollow internal channel, and an aperture of the right arm, such that the attachment end is removably attached to the central #1 hinge assembly;

attaching a hitch pin to the clevis pin, wherein the hitch pin is configured to prevent disengagement of the clevis pin from the central #1 hinge assembly.

16. The method of claim 15, wherein removable attachment of the body to the central #1 hinge assembly is toolless.

17. The method of claim 15, further comprising sliding the handle member over an end of the left arm proximal to the handle member end and inserting an end of the right arm proximal to the handle member end into the handle member.

18. The method of claim 15, wherein the attachment end comprises one of: one single piece of material; and two separate pieces of material.

19. The method of claim 15, wherein the handle member end further comprises a rod within the handle member, the rod coupling the left arm to the right arm.

20. The method of claim 15, wherein the handle member, the left arm and the right arm comprise a single piece of material having at least one point of attachment to the central #1 hinge assembly.

* * * * *